Jan. 18, 1938.   C. L. BURDICK   2,105,683
APPARATUS FOR DETERMINING THE MOISTURE CONTENT OF SUBSTANCES
Filed May 12, 1936   2 Sheets-Sheet 1

INVENTOR:
C. L. Burdick

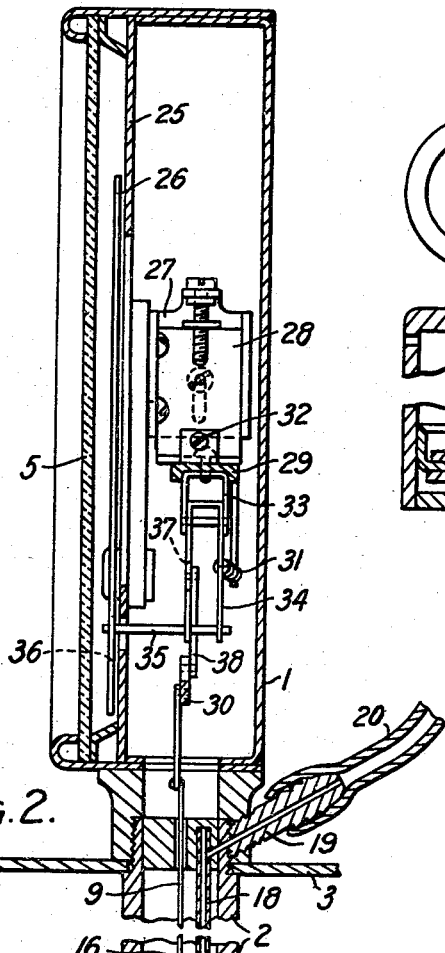

Patented Jan. 18, 1938

2,105,683

UNITED STATES PATENT OFFICE 2,105,683

APPARATUS FOR DETERMINING THE MOISTURE CONTENT OF SUBSTANCES

Charles Laurence Burdick, London, England

Application May 12, 1936, Serial No. 79,354
In Great Britain May 25, 1935

4 Claims. (Cl. 73—51)

This invention comprises improvements in apparatus for determining the moisture content of substances.

The invention has for its object the provision of a convenient apparatus for determining the moisture content of granular substances, such as grains, sand, earth and the like, and of bales, bundles and collections of other substances, such as paper, cotton, silk, tobacco, vegetable fibres and the like which have interstices.

By ascertaining the humidity of the air which is present in such substances, it is possible, by means of empirically ascertained data, to determine with a high degree of accuracy the percentage by weight of their moisture content. This information is valuable not only in commerce, where the quantity of water contained in the goods commonly has a bearing on their price value, but is also very important industrially in cases in which the moisture content of materials affects processing methods, and in other circumstances where moisture content may cause deterioration.

I construct in accordance with my invention, an apparatus for determining the moisture content of substances having interstices, comprising a hygroscopic element, means to penetrate to said interstices, means to remove air from around said element and to lead air from said interstices to said hygroscopic element, and indicating or recording means associated with said element.

The invention further comprises an apparatus for determining the moisture content of substances having interstices, comprising a tubular member adapted to penetrate said substances to said interstices, a hygroscopic element within said tubular member, means to admit air from said interstices to said hygroscopic member, indicating means carried at one end of said tubular member and associated with said hygroscopic element, and means for connecting the interior of said tubular member to a suction pump.

An instrument which, in accordance with normal practice, is so constructed and operated that the air surrounding the hygroscopic element when it is introduced into the material is left to mingle with, and to a considerable extent condition the interstitial air cannot be very accurate. According to my invention I remove this source of error by providing means for removing the air which has been introduced into the substance with the instrument and replacing it with the interstitial air from the substance itself; this interstitial air being slowly passed over the hygroscopic element causes the instrument to register, with a high degree of accuracy, the relative humidity of the interstitial air.

Cone fibre, hair, goldbeaters' skin or other hygroscopic substance which reacts to humidity, may be utilized in the instrument.

A second calibration may be made on the same dial so that the pointer may, at the same time, indicate the ascertained percentage of moisture in a particular substance or class or substances, or tables may be provided which will indicate the moisture content of any particular substance as ascertained by empirical tests when the relative humidity of the interstitial air is known.

Further features of my invention will be understood from the following description and by reference to the accompanying drawings, of which, Figure 1 is a rear sectional elevation, showing one construction of hygrometer in accordance with my invention, the outer casing being removed to show the inner mechanism.

Figure 2 is a side elevation partly in section.

Figure 3 is a sectional view of an exhaust air pump.

Figures 4, 5, 6, 7 and 8 are sectional views on the lines A—A, B—B, C—C, D—D and E—E respectively, of Figure 1, and Figure 9 is a sectional view corresponding to Figure 8 but showing a modification.

Figure 1:
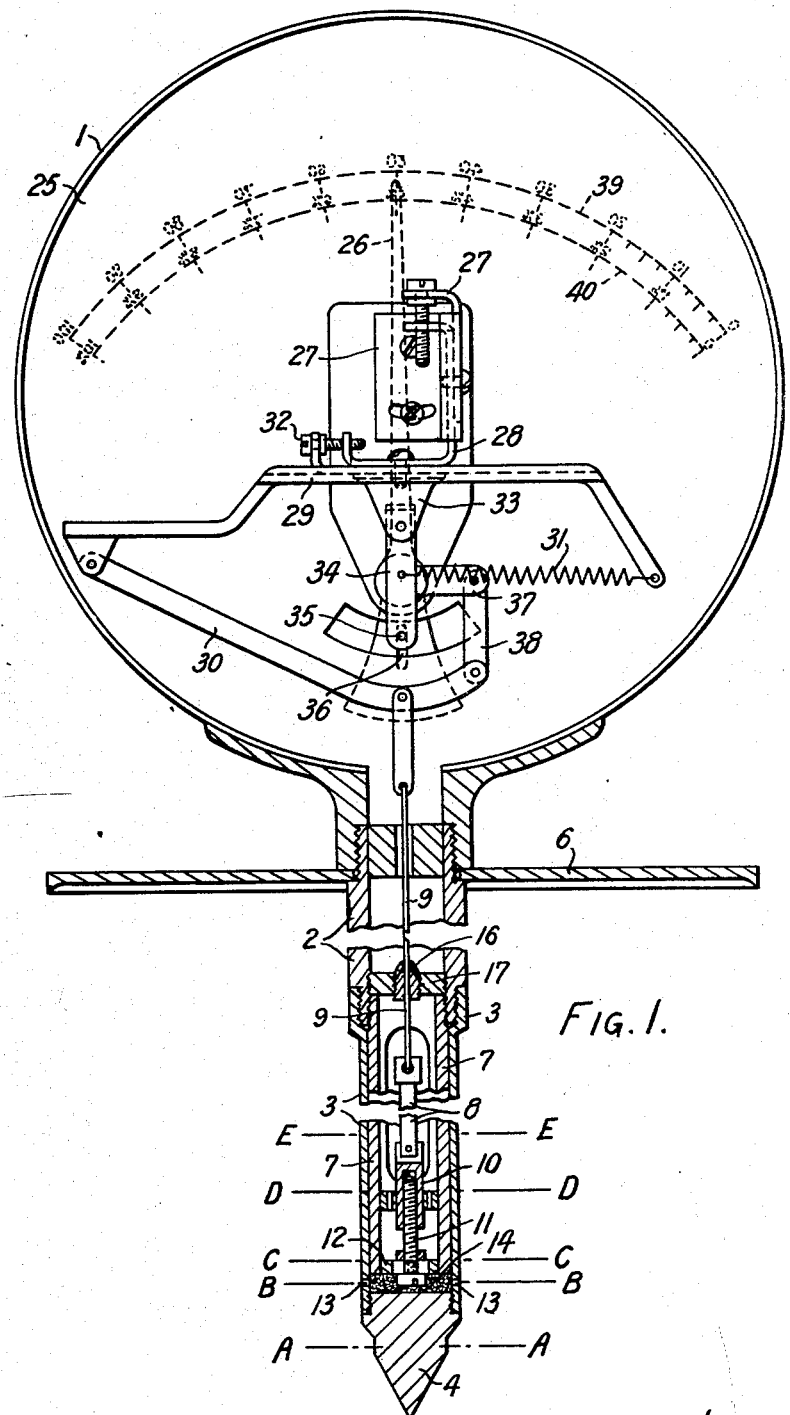

A circular casing 1, has a tubular extension 2, which is further extended by a second tubular piece 3, which has a pointed terminal piece 4.

The front of the casing is provided with a glass 5.

A disc-like shield 6 may be provided if required, which will prevent the air at the surface of the material immediately around the instrument from being drawn in.

Within the tubular piece 3, I provide an extended support 7, for one end of an hygroscopic element 8.

The inner end of the piece 8 is secured by means of a fine wire 9 to the registering mechanism within the casing, the other end is secured to the piece 10, which is square in section, (see Figure 7) and is adjustable longitudinally by a screw 11 in a fixed support 12.

The support for the adjustable mechanism may be a long rod 7¹, such as is shown in section in Figure 9 or preferably a tubular piece 7 open on each side, such as is shown in Figures 1, 6, 7 and 8; this piece is secured to the tubular piece 2.

The tubular piece 3 has openings 13, at, or near the outer end (see Figure 5). Within the tubular piece 3 a chamber may be provided to receive fibrous or any other suitable filtering material 14, as indicated in Figures 1 and 5, to prevent solid matter being drawn into the interior of the tubular piece 3.

The wire 9 passes through a gland 16 in a partition 17, and is linked up with the registering mechanism in the casing 1.

A small tubular air passage 18 connects the chamber in the tubular piece 3, with a nipple 19, designed to receive one end of a flexible tube 20, which provides a connection with the exhaust air pump shown in Figure 3.

This pump is of well-known type in which a plunger 21 is moved back and forth in a tubular casing 22; it is provided with a check valve at 23.

Within the casing 1 is a dial 25 on which is mounted a pointer 26.

This pointer 26 is actuated by the contraction and expansion of the hygroscopic element by means of the mechanism which is mounted on a bracket or support 27, secured to the back of the dial.

This bracket carries an adjustable piece 28, which is a support for a piece 29 with extended arms.

One arm forms a support for a lever 30 to which the wire 9 is connected, and the other arm provides a fastening for a spring 31.

The piece 29 is adjustable longitudinally in its support on the piece 28 by means of a screw 32.

A bracket 33 mounted on the piece 29 carries a U-shaped hinged piece 34, to which one end of the spring 31 is secured; this hinged piece 34 is provided with a pin or rod 35 which passing through a slot in the dial 25 enters a slot 36 in the pointer 26.

The hinged piece 34 has a right angle extension 37 which is connected by a link 38 with the outer end of the lever 30.

The calibrations on the dial (shown in reverse) have a reading for relative humidity 39 and, as may be required, a reading 40, which indicates the percentage of moisture in any particular substance.

The tubular extensions 2 and 3 may be round in cross section, as shown in the drawings, or oval or flattened for convenience in inserting into stacks of paper or other substance.

The instrument being provided with a calibration for relative humidity, can be frequently tested and adjusted for correct reading.

The screw 11 provides means for setting the pointer correctly. The adjustment on the support 27 of the piece 28 will provide for variations in the amplitude of the movements of the pointer, and the adjusting screw 32 will provide means for adjusting the relative amplitude of movement at either end of the calibration, this it does by changing the relative position of the pivotal point of the pointer and the pivotal point of the hinged piece 34.

The operation of the instrument is as follows:—Having ascertained that the temperature of the tubular chamber corresponds with the temperature of the material to be tested, it is inserted well into the bulk of the material; the air exhaust pump is then operated, this will remove the air already in the tube and air which is distributed among the interstices, or meshes of the material, will be drawn in to replace it. This air will contact the hygroscopic element and the instrument will register the percentage of relative humidity of the air. By comparing this with tables provided for the particular material being tested, the percentage of water or moisture content of the material may be ascertained with a high degree of accuracy, or, as before explained, the percentage of moisture in the substance may be read direct from the second calibration on the dial.

What I claim is:—

1. An apparatus for determining the moisture content of substances having interstices, comprising a tubular member having a pointed end adapted to penetrate said substances to said interstices, a hygroscopic element within said tubular member, apertures in said tubular member, indicating means carried at the end of said tubular member remote from said pointed end and operatively interconnected with said hygroscopic element, a partition extending across the interior of said tubular member between said hygroscopic element and said indicating means and means for connecting the portion of the interior of said tubular member between said partition and said pointed end to a suction pump.

2. An apparatus as claimed in claim 1 in which the said connecting means comprise a nipple for the attachment of a flexible tube located between said partition and said indicating means, and a tubular air passage leading from said nipple and passing through said partition.

3. An apparatus for determining the moisture content of substances having interstices, comprising a tubular member adapted to penetrate said substances to said interstices, a hygroscopic element within said tubular member, apertures in proximity to one end only of said tubular member to admit air from said interstices to said hygroscopic member, indicating means carried at the other end of said tubular member and associated with said hygroscopic element, and means for connecting the interior of said tubular member between said hygroscopic member and said indicating means to a suction pump, together with filtering material disposed inside the tubular member between the said apertures and the hygroscopic element.

4. An apparatus for determining the moisture content of substances having interstices, comprising a tubular member adapted to penetrate said substances to said interstices, a hygroscopic element within said tubular member, apertures in proximity to one end only of said tubular member to admit air from said interstices to said hygroscopic member, indicating means carried at the other end of said tubular member and associated with said hygroscopic element, and means for connecting the interior of said tubular member between said hygroscopic member and said indicating means to a suction pump together with a partition across the interior of the tubular member adjacent the indicating means, a connection from the hygroscopic element to the indicating means passing through said partition and a gland at the point at which said connection passes through said partition.

CHARLES LAURENCE BURDICK.